United States Patent [19]

Sugiura et al.

[11] 4,413,527
[45] Nov. 8, 1983

[54] SEMICONDUCTOR PRESSURE SENSOR

[75] Inventors: Junzi Sugiura, Toyota; Hiroshi Okada, Hekinan; Michitaka Hayashi; Toru Yamazaki, both of Kariya; Hiroshi Sugimoto, Toyota, all of Japan

[73] Assignee: Nippondenso Co., Ltd., Kariya, Japan

[21] Appl. No.: 366,087

[22] Filed: Apr. 6, 1982

[30] Foreign Application Priority Data

Apr. 14, 1981 [JP] Japan .................................. 56-55835

[51] Int. Cl.³ .............................................. G01L 9/08
[52] U.S. Cl. .................................. 73/754; 73/DIG. 4; 73/115; 307/91; 333/12
[58] Field of Search ................... 73/754, 431, DIG. 4, 73/115, 727, 723, 721, 717; 307/91; 333/12

[56] References Cited

U.S. PATENT DOCUMENTS 3,212,004  10/1965  Rumoller .............................. 333/12
4,325,260  4/1982  Takahashi et al. .................... 73/115
4,348,331  5/1983  Fukuhare et al. .................... 333/12

Primary Examiner—Donald O. Woodiel
Attorney, Agent, or Firm—Cushman, Darby & Cushman

[57] ABSTRACT

A semiconductor pressure sensor has an encased sensor unit, and a metal casing having a pressure introduction pipe and housing therein the sensor unit. The metal casing has therein synthetic resin poured by potting to fix the sensor unit securely in the metal casing. Through-type capacitors are affixed to the metal casing. The sensor unit produces an electrical signal transmitted out through the through-type capacitors and over lead wires connected to the through-type capacitors. With this arrangement, the semiconductor pressure sensor is protected against electromagnetic interference (EMI), and moisture is prevented from entering the metal casing.

5 Claims, 3 Drawing Figures

4,413,527

SEMICONDUCTOR PRESSURE SENSOR

BACKGROUND OF THE INVENTION

The present invention relates to a semiconductor pressure sensor for use on automotive vehicles for measuring an intake vacuum in the engine, and more particularly to such a semiconductor pressure sensor which is constructed to reduce electromagnetic interference and prevent entry of moisture into the sensor.

Various systems for electronic control of automotive engines are in use today. One such system includes a pressure sensor for detecting an intake vacuum in the engine to control the air-fuel ratio of an air-fuel mixture to be supplied to engine cylinders. For stable operation of the electronic control systems or devices, they are required to be protected against electromagnetic radiation from an increasing number of different sources such as mobile radio transmitters, radio and television broadcasting stations. To meet the above requirement, it is important that electronic control units and sensors of the devices be immune to electromagnetic interference (generally abbreviated as "EMI").

The pressure sensor is normally mounted on a printed circuit board. Since the printed circuit board is subjected to erosion due to moisture, it is necessary to protect the printed circuit board from moisture attack which would otherwise take place along lead wires connected to the printed circuit board.

SUMMARY OF THE INVENTION

It is an object of the present invention to provide a semiconductor pressure sensor for use on automobiles which is reliably protected against malfunctioning due to interfering electromagnetic waves.

Another object of the present invention is to provide a semiconductor pressure sensor which is constructed to prevent moisture entry therein.

According to the present invention, a sensor unit except for a pressure introduction port thereof is electromagnetically shielded and is connected to lead wires through through-type capacitors coupled to a sensor casing. High-frequency noises which tend to be delivered over the lead wires to the sensor unit are led to the casing via the capacitors without reaching the sensor unit. With the through-type capacitors coupled between the lead wires and a circuit board, the lead wires do not extend into the sensor casing, and hence there is no danger for moisture to find its way into the casing and the circuit board along the lead wires.

BRIEF DESCRIPTION OF THE DRAWINGS

The present invention will be described in further detail with reference to the accompanying drawings wherein.

DETAILED DESCRIPTION

Figure 1:
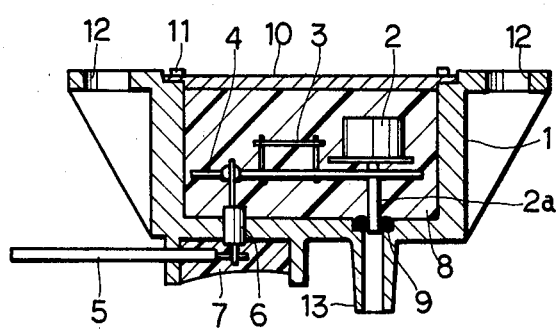
FIG. 1 is a cross-sectional view taken along line I—I of FIG. 2, showing a semiconductor pressure sensor according to the present invention.
Figure 2:
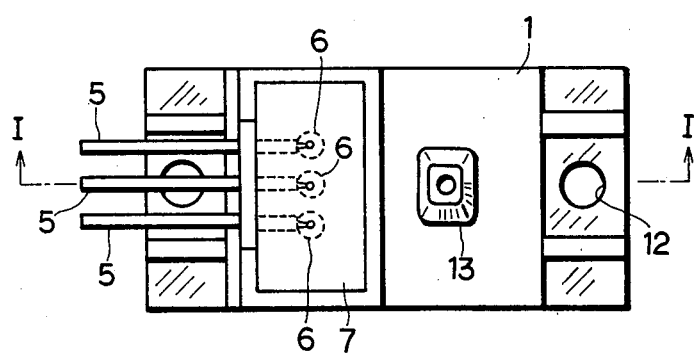
FIG. 2 is a plan view of the semiconductor pressure sensor shown in FIG. 1; and, FIG. 3 is a schematic view illustrative of the wiring arrangement in which a through-type capacitor and a sensor casing are electrically connected to each other.
Figure 3:
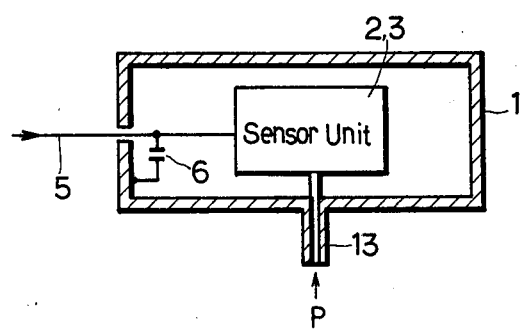

In FIGS. 1 and 2, a semiconductor pressure sensor comprises a casing 1 made of an electrically conductive material such as metal. In the illustrated embodiment, the casing 1 is made of aluminum by die casting. The casing 1 is substantially in the form of a box with its upper end open, as illustrated in FIG. 1.

A semiconductor pressure sensor unit 2 encased in a housing is disposed in the casing 1, the sensor unit 2 being capable of detecting an absolute pressure. A circuit unit 3 serves to amplify an output from the pressure sensor unit 2. The pressure sensor unit 2 and the circuit unit 3 are mounted on a printed circuit board 4 mounted in the casing 1. A plurality of lead wires 5, which serve respectively as a line for supplying electric power from a power supply, a grounded line, and a line for delivering an output from the pressure sensor 2, are soldered at terminals thereof to ends of a plurality of through-type capacitors 6, respectively, which are fixedly fitted in through holes in the casing 1. Each through-type capacitor 6 has the end disposed in the casing 1 and connected to the circuit unit 3 by soldering.

The capacitors 6 are thus electrically coupled between the lead wires 5 and the casing 1 to lead high-frequency currents or noises which enter from the lead wires 5 to the metal casing 1, thereby preventing such noises from reaching the circuit unit 3. The junctions between the capacitors 6 and the lead wires 5 are sealed in a mass of synthetic resin 7 deposited on the casing 1 by way of potting. Likewise, a mass of synthetic resin 8 is poured in the casing 1 by potting to seal and fix the sensor unit 2 and the circuit unit 3. An 0-ring 9 of insulating material is disposed in a recess in the casing 1 in hermetical relation between a pressure introduction tube 2a extending from the sensor unit 2 and an annular wall of the casing 1. A metal cover plate 10 is placed over the upper open end of the casing 1 and fixed to the casing 1 by screws 11. The casing 1 includes an attachment flange having holes 12 for passage therethrough of bolts or other fasteners to secure the casing 1 to an attachment base (not shown). The casing 1 also includes a pressure introduction pipe 13 aligned for communication with the pressure introduction tube 2a for introducing a pressure to be measured, such as an intake vacuum in an engine. The pressure introduction pipe 13 has a length of 15 mm or more, 20 mm for example, and a bore diameter in the range of from 1.5 mm through 2.5 mm, dimensions which are selected to give the best attenuation rate for electromagnetic waves that enter the casing 1 through the pressure introduction pipe 13.

The through-type capacitors 6 are in the form of known ceramic capacitors each having a lead wire extending centrally therethrough. One of electrodes of the capacitor is connected to such a lead wire, and the other electrode is constituted by an outer peripheral surface of the capacitor, which is connected to the casing 1.

The semiconductor pressure sensor thus constructed will operate as follows:

There are two forms of electromagnetic interference which would impair the performance of the semiconductor pressure sensor. Electromagnetic waves would enter directly into the casing 1 to adversely affect the circuit unit 3, and would be picked up as noises by the lead wires 5 in being introduced into the circuit unit 3. To cope with direct entry of electromagnetic waves, the sensor unit 2 and the circuit unit 3 are substantially completely enclosed by electrically conductive members, that is, the casing 1 and the cover plate 10. The units 2, 3 are thus electromagnetically shielded to reduce the influences of electromagnetic interference. The pressure introduction pipe or port 13, which is not completely electromagnetically shielded, has a shape that is selected to attenuate the intensity of electromagnetic waves which enter the pipe 13. Any electromagnetic waves which are picked up as high-frequency noises by the lead wires 5 are guided through the through-type capacitors 6 to the casing 1, and hence do not reach the circuit unit 3 and the sensor unit 2. The through-type capacitors 6 are hermetically fitted in the holes in the casing 1, and no high-frequency noises find their way into the casing 1 via the capacitors 6. Therefore, electromagnetic waves and high-frequency noises are prevented from entering directly or indirectly into the casing 1, with the result that the circuit unit 3 can operate securely without malfunctioning due to electromagnetic interference.

The lead wires 5 are all connected to the through-type capacitors 6, and do not extend into the casing 1. Moisture is prevented by the through-type capacitors 6 from reaching the circuit board 4 within the casing 1. Thus, the circuit board 4 is free from moisture attack and hence has increased durability.

Although a certain preferred embodiment has been shown and described in detail, it should be understood that many changes and modifications may be made therein without departing from the scope of the appended claims. For example, the casing 1 may be made of synthetic resin with a copper box having one open end press-fitted therein, and through-type capacitors may be soldered to the copper box. Alternatively, a casing of synthetic resin may be coated on its outer surface with an electrically conductive material, or may be rendered electrically conductive in any known manner to the extent that will not adversely affect through-type capacitors coupled thereto.

What is claimed is:

1. A semiconductor sensor unit comprising:
    a casing including a pressure introduction pipe and an electrically conductive member;
    a pressure sensor unit enclosed by said electrically conductive member in said casing for detecting a pressure introduced through said pressure introduction pipe;
    a circuit unit enclosed by said electrically conductive member in said casing for amplifying an output signal delivered from said pressure sensor unit; and,
    at least one through-type capacitor mounted on said casing and electrically connected to said electrically conductive member, the arrangement being that a signal from said circuit unit is delivered out of said casing through said through-type capacitor.

2. A semiconductor sensor unit according to claim 1, wherein said pressure sensor unit includes a pressure introduction tube aligned for communication with said pressure introduction pipe, there being an 0-ring mounted in said casing and hermetically sealing said pressure introduction tube at said pressure introduction pipe.

3. A semiconductor sensor unit according to claim 1, wherein said pressure introduction pipe has a length of 15 mm or more and a bore diameter in the range of 1.5 mm to 2.5 mm.

4. A semiconductor sensor unit according to claim 1 or 2, including a mass of synthetic resin filled in said casing by potting.

5. A semiconductor sensor unit according to claim 1, including at least one lead wire electrically connected to said through-type capacitors at a junction, and a mass of synthetic resin deposited around said junction by potting.

* * * * *